United States Patent
Kirk

[11] 3,835,363
[45] Sept. 10, 1974

[54] MOTOR VEHICLE POWER SUPPLY SYSTEM

[75] Inventor: Thomas E. Kirk, Anderson, Ind.

[73] Assignee: General Motors Corporation, Detroit, Mich.

[22] Filed: Dec. 17, 1973

[21] Appl. No.: 425,264

[52] U.S. Cl.......................... 320/64, 322/28, 322/73
[51] Int. Cl............................................. H02j 7/16
[58] Field of Search............ 320/61, 32, 64, 68, 14; 322/28, 73

[56] References Cited
UNITED STATES PATENTS

| | | | |
|---|---|---|---|
| 3,343,059 | 9/1967 | Kirk et al.......................... | 322/73 X |
| 3,373,333 | 3/1968 | Eckard.................................. | 320/32 |
| 3,496,443 | 2/1970 | Snedecker et al. ................ | 322/28 X |

Primary Examiner—J. D. Miller
Assistant Examiner—Robert J. Hickey
Attorney, Agent, or Firm—C. R. Meland

[57] ABSTRACT

A motor vehicle power supply system where the direct current electrical loads in the motor vehicle are supplied by a main bridge-rectifier circuit connected to an alternating current generator. The output voltage of the generator is regulated by a transistor voltage regulator having a transistor switching means connected in series with the field winding of the generator. The field winding is energized by a full-wave rectifier circuit comprised of three auxiliary diodes and three diodes of the main bridge rectifier connected with the AC output terminals of the alternating current generator. The voltage regulator is permanently connected with the battery of the electrical system through a first energizing circuit such that the battery biases the output transistor of the regulator into a conductive condition. This first energizing circuit includes a resistor which is operative to limit current drain on the system during a shut-down condition of the motor vehicle. When the generator of the electrical system is driven by the motor vehicle engine, the three auxiliary diodes provide base drive current to the base-emitter circuit of the output transistor of the voltage regulator through a second energizing circuit that has less electrical resistance than the first energizing circuit that is permanently connected to the battery.

2 Claims, 1 Drawing Figure

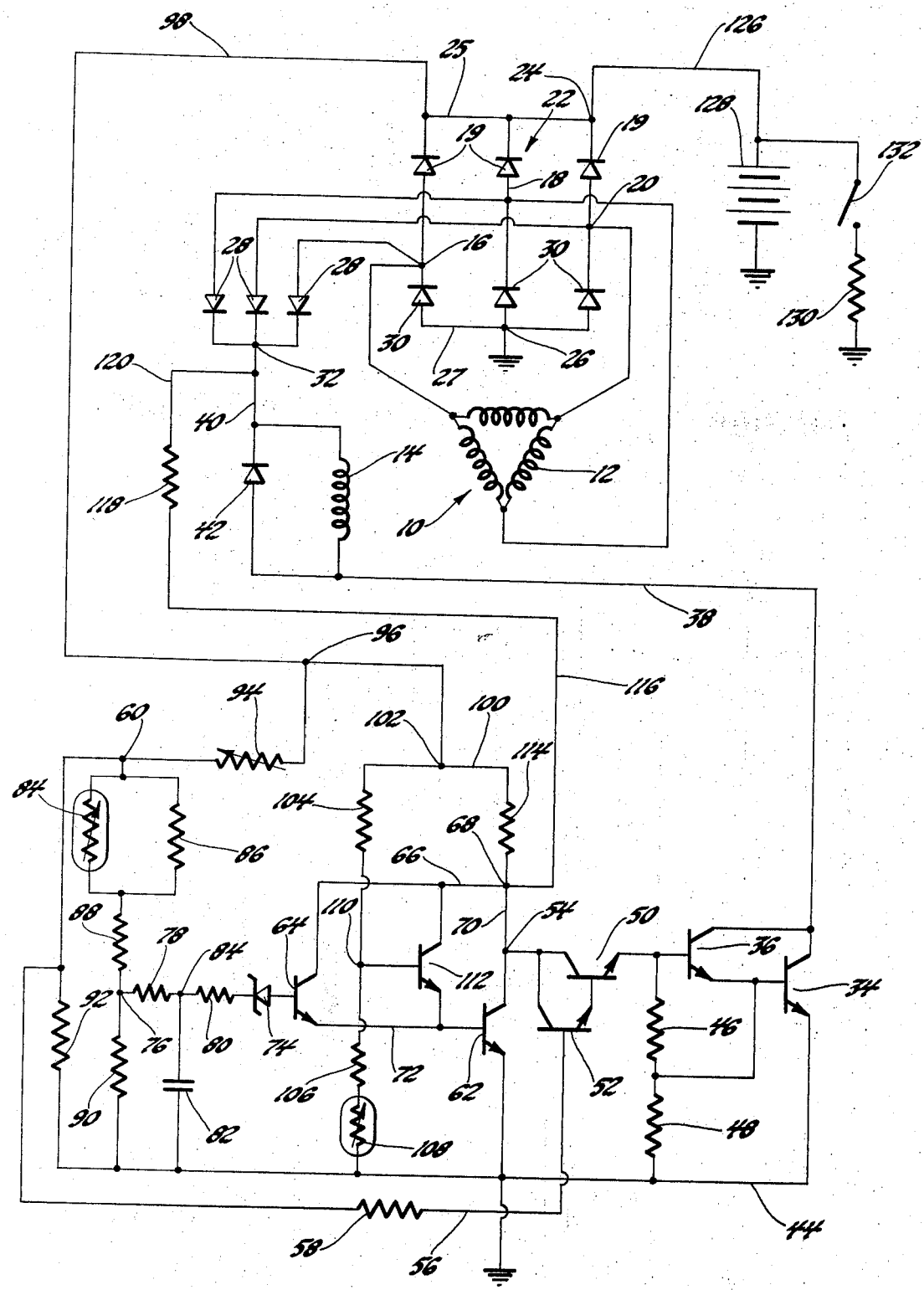

MOTOR VEHICLE POWER SUPPLY SYSTEM

This invention relates to a power supply system for a motor vehicle where a diode-rectified alternating current generator supplies the electrical loads on the motor vehicle including the battery.

Motor vehicle electrical systems utilizing diode-rectified alternating current generators and transistor voltage regulators are known to those skilled in the art one example of which is disclosed in the U.S. patent to Harland et al U.S. Pat. No. 3,469,168. In this patent a part of the voltage regulator and the field of the generator are initially energized by the battery of the system when an ignition switch is closed through a parallel connected resistor and signal lamp. In the type of circuit disclosed in the Harland et al patent, the initial regulator and field energizing circuit that includes the ignition switch is bypassed by a plurality of auxiliary diodes connected with the AC output terminals of the alternator and operative to energize the field circuit when the generator comes up to voltage, as when it is being driven by the vehicle engine.

In contrast to the motor vehicle electrical system disclosed in the Harland et al patent, it is an object of this invention to provide a motor vehicle electrical system where the battery is permanently connected to the main power rectifier and voltage regulator and wherein the battery is operative to bias the output transistor of the voltage regulator to a conductive condition during a shut-down condition of the motor vehicle. When the generator is driven to develop an output voltage the field winding of the generator is energized immediately through the conductive transistor by a circuit including the auxiliary field energizing diodes connected with the AC output terminals of the alternator. In carrying this object forward, the permanent electrical connection between the battery and a part of the voltage regulator has enough electrical resistance that the battery is not discharged to any substantial degree during a shut-down condition of the vehicle and its electrical system. The circuit permanently connecting the battery and a part of the transistor regulator is bypassed by a lower resistance circuit connected between the auxiliary field energizing diodes of the electrical system and the transistor regulator. The lower resistance circuit does not come into operation until the generator is driven by the engine of the vehicle to develop an output voltage and when in operation provides sufficiently high base drive for the output transistor of the voltage regulator to effectively regulate the output voltage of the system.

It accordingly is one of the objects of this invention to provide a motor vehicle electrical system that includes a diode-rectified alternator and a transistor voltage regulator wherein the battery is permanently electrically connected to the regulator but wherein the system does not put an excessive current demand on the battery during a shut-down condition of the vehicle but yet is capable of providing sufficient base drive to the output transistor of the voltage regulator to provide effective voltage regulation for the system.

The single FIGURE drawing is a schematic circuit diagram of a motor vehicle electrical system made in accordance with this invention.

Referring now to the drawing, the reference numeral 10 generally designates an alternating current generator having a three phase Delta-connected output winding designated by reference numeral 12 and a field winding designated by reference numeral 14. The alternating current generator 10 may be of the brushless type like that disclosed in the U.S. patent to Raver U.S. Pat. No. 3,271,601 or can be of a type where the field is carried by a Lundell rotor and energized through brushes. The generator should be of a type such that the magnetic parts of the generator have sufficient magnetic retentivity that a voltage is induced in output winding 12 by residual magnetism when the generator is driven by the engine of the vehicle. The alternator 10 has a rotor (not illustrated) which is driven by an engine (not illustrated) of the motor vehicle.

The three phase output winding 12 of the alternating current generator 10 is connected with the AC input terminals 16, 18 and 20 of a three-phase full-wave power bridge rectifier network generally designated by reference numeral 22. The bridge rectifier is made up of groups of silicon diodes 19 and 30. The cathodes of diodes 19 are commonly connected to conductor 25 which is connected to positive direct current output terminal 24. The anodes of diodes 30 are commonly connected to conductor 27 which is connected to negative direct current output terminal 26 that is grounded.

The electrical system of this invention has three auxiliary regulator and field-energizing diodes 28 which together with the negative diodes 30 of bridge rectifier 22 form a field and regulator energizing circuit between junction 32 and ground. The anodes of the field energizing diodes 28 are connected respectively to the AC input terminals 16, 18 and 20 of the bridge rectifier 22. The cathodes of the diodes 28 are commonly connected to junction 32 and with this arrangement it will be appreciated by those skilled in the art that a direct voltage is developed between junction 32 and ground whenever the generator 10 is driven by the vehicle engine to develop a predetermined output voltage.

The voltage regulator of the vehicle electrical system includes a pair of NPN transistors 34 and 36 connected in a well known Darlington configuration. The collectors of transistors 34 and 36 are connected with a conductor 38 which is connected to one side of field winding 14. The opposite side of field winding 14 is connected with a conductor 40 which in turn is connected to junction 32. A field discharge diode 42 is connected across the field winding 14. As will become more readily apparent hereinafter, the current flow through field winding 14, when the generator is in operation, is controlled by the switching of transistors 34 and 36. The field circuit is from junction 32, through conductor 40, through field winding 14, through conductor 38, through the collector-emitter circuit of switching transistor 34, and then to grounded conductor 44. This circuit is energized with direct current due to the full-wave rectification of the alternating output voltage of the output winding 12 by diodes 30 and diodes 28.

The base of transistor 36 is connected to one side of series connected resistors 46 and 48, the junction of which is connected to the base of transistor 34.

The voltage regulator of this invention further includes a pair of NPN transistors 50 and 52 which are connected in a Darlington connection. The emitter of transistor 50 is connected directly with the base of transistor 36. The collectors of transistors 50 and 52 are connected together and to a junction 54. The base of transistor 52 is connected with a conductor 56 which in turn is connected to one side of resistor 58. The opposite side of resistor 58 is connected with a junction 60. As will become more readily apparent hereinafter, the transistors 50 and 52 are biased to a conductive condition by the battery of the system to electrically connect junction 54 and the base of transistor 36. This arrangement is disclosed and claimed in the U.S. patent to Harland et al U.S. Pat. No. 3,539,864 and as disclosed therein the transistors 50 and 52 prevent operation of the voltage regulator when no direct voltage is applied between junction 60 and ground.

The regulator of this invention further includes NPN transistors 62 and 64. The collectors of transistors 62 and 64 are connected together via conductor 66, junction 68 and conductor 70. The emitter of transistor 64 is connected to the base of transistor 62 by a conductor 72 and it is seen that the emitter of transistor 62 is connected directly to ground at conductor 44. It will be appreciated by those skilled in the art that the transistors 64 and 62 are connected in a Darlington connection.

The base of transistor 64 is connected in series with a Zener diode designated by reference numeral 74. The opposite side of the Zener diode is connected with junction 76 through resistors 78 and 80. A capacitor 82 is connected between junction 84 and the grounded conductor 44.

The junction 76 is located on a voltage divider circuit connected between junction 60 and conductor 44. This voltage divider circuit comprises a thermistor 84 connected in parallel with a resistor 86. The thermistor 84 has a negative temperature coefficient of resistance. This parallel combination is connected in series with resistors 88 and 90. A trimming resistor designated by reference numeral 92 is connected in parallel with the voltage divider circuit.

The junction 60 forms a voltage sensing junction for the voltage regulator and is connected with a regulator setting adjustable resistor designated by reference numeral 94. The opposite side of resistor 94 is connected with a junction 96 and this junction is directly connected to the positive direct current output terminal 24 of the bridge rectifier 22 by a conductor 98 and bridge rectifier conductor 25. If desired the resistor 94 may take the form of an adjustable cube as disclosed in U.S. patent to Alexander et al U.S. Pat. No. 3,659,188.

The junction 96 of the motor electrical system is connected with a conductor 100 at junction 102. The voltage regulator has a voltage divider circuit comprised of resistor 104, resistor 106, and thermistor 108 series connected between the junction 102 and the grounded conductor 44. The thermistor 108 has a negative coefficient of resistance. The junction 110 of this circuit is connected to the base of an NPN transistor 112. The collector of transistor 112 is connected to conductor 66 while the emitter of this transistor is connected to conductor 72. The base-emitter circuit of transistor 112 operates as a forward biased diode and forms a part of an over voltage protection circuit of the same type that is disclosed in the U.S. patent to Harland et al U.S. Pat. No. 3,597,654. As disclosed in that patent, the voltage divider 104, 110, 106 and 108 together with the forward biased diode provided by the base-emitter of transistor 112 serve to provide voltage regulation for the voltage regulator in the event of a high voltage condition.

The junction 68 of the voltage regulator is connected to junction 102 through a resistor designated by reference numeral 114. It can be seen that the junction 68 is also connected to the positive field energizing terminal 32 through conductor 116, resistor 118 and conductor 120. In a 12 volt electrical system the resistor 114 has a resistance value that is higher than the resistance value of the resistor 118. By way of example, the resistor 114 may be approximately 3,000 ohms and the resistor 118 may be approximately 500 ohms.

The positive terminal 24 of main power bridge rectifier 22 is connected with a conductor 126 which in turn is connected to the positive side of a battery 128. The battery 128 has a negative terminal which is grounded. The electrical loads on the motor vehicle are designated by reference numeral 130 and are selectively energized by closure of a switch 132.

The operation of the electrical system will now be described. As previously mentioned, the field current for field winding 14 is controlled by the continuous on-off switching of transistors 34 and 36 when the generator is being driven by an engine to supply the electrical system. Assuming that transistors 50 and 52 are biased conductive the transistors 36 and 34 are biased on and off as a function of the voltage appearing between junction 68 and grounded conductor 44. The voltage appearing between junction 68 and conductor 44 varies between low and high values depending upon the instantaneous output voltage appearing between output terminal 24 and ground. The switching of transistors 64 and 62 is controlled in accordance with the voltage appearing between junction 76 and conductor 44. The voltage at junction 76 is a function of the voltage appearing between terminal 24 and ground due to the circuit including conductor 98, resistor 94, junction 60, and the voltage divider comprised of parallel connected thermistor 84 and resistor 86, resistor 88 and resistor 90. When the voltage at junction 76 represents a generator output voltage which is higher than the desired regulated voltage, the Zener diode 74 conducts providing base-emitter current for both transistors 64 and 62. With these transistors conductive the junction 68 approaches the voltage of conductor 44, less the voltage drop across the collector-emitter circuit of transistor 62 with the result that transistors 36 and 34 are biased non-conductive. This causes the current to be reduced in field winding 14 with the result that voltage at junction 76 drops slightly due to a reduced output voltage of the diode-rectified alternator. When the voltage at junction 76 drops to a predetermined value the base drive to transistors 64 and 62 is reduced to a point where these transistors are biased substantially non-conductive. This causes the voltage of junction 68 to increase which causes the transistors 36 and 34 to be biased on to thereby increase field current. The system operates such that transistor 34 is operated in a continuous switching mode to provide an average current in the field winding 14 to hold the output voltage of the generator 10 and bridge rectifier 22 at some predetermined desired regulated value.

The purpose of transistors 50 and 52 as previously described is to disconnect junction 54 and the base of transistor 36 in the event that there is no direct voltage applied between junction 60 and ground. This is described in the above mentioned patent to Harland et al U.S. Pat. No. 3,539,864.

The base-emitter of transistor 112 provides a forward biased diode and this diode together with the voltage divider 104, 106 and 108 provide voltage regulation for the system in the event of an over-voltage condition. This is described in the U.S. patent to Harland et al U.S. Pat. No. 3,597,654.

The electrical system of this invention is arranged such that no switch is required to connect and disconnect the regulator and battery. Thus, the system is arranged to be permanently connected with the battery 128 and yet provide a system that does not put an undue drain on the battery but yet which is capable of providing a rapid build-up in output voltage of the generator 10 when the rotor of the generator 10 is driven by an engine.

It can be seen that the voltage regulator is permanently electrically connected (no switch contacts) to the positive side of battery 128 even when the system is in a shut-down condition. This circuit can be traced from the positive side of battery 128, through conductor 126, through conductor 25, through conductor 98, through conductor 100 and through resistor 114 to junction 68. The circuit to the negative side of the battery is then through conductor 70, the collector-emitter path of transistor 50 and then through the series connected base-emitter paths of transistors 36 and 34. Assuming a shut-down condition of generator 10 such that the engine is not driving the generator, the circuit that has just been traced is arranged such that when transistors 50 and 52 are conducting the voltage applied between the base and emitters of transistors 36 and 34 (transistor 62 is non-conductive) is sufficient to bias the transistor 34 to a substantially fully conductive saturated condition. Since it is assumed that the electrical system is now in a shut-down condition the generator has no output voltage and the diodes 28 therefore do not provide a direct voltage to field winding 14 so there is no substantial collector-emitter current through transistor 34. Moreover, the resistor 114 is of such a high value (3,000 ohms) as to not put an undue drain on the 12 volt battery 128.

When the rotor of the alternating current generator is initially driven by the engine of the motor vehicle, a voltage is initially induced in the output winding 12 due to the residual magnetism of the magnetic parts of the generator. When this voltage reaches a value sufficient to forward bias diodes 28 and overcomes the saturation voltage of Darlington connected transistors 34 and 36 a small field current is produced to provide regenerative action of induced voltage versus field current for generator build-up. As the generator comes up to voltage the base drive circuit connected with junction 68 will now be energized through the resistor 118 and conductor 120. Thus, when the generator does come up to voltage the voltage developed between junction 32 and ground now supplies base drive current to the base-emitter circuits of transistors 34 and 36 through resistor 118 which has a substantially lower value of resistance than resistor 114. The resistance of resistor 118 is of such a value that the transistors 34 and 36 are effectively switched on and off to adequately regulate the output voltage of the electrical system as transistors 64 and 62 switch on and off under control of Zener diode 74.

As previously mentioned, when the electrical system is in a shut-down condition the output transistor 34 is biased conductive. There is a circuit path now provided for energizing field winding 14 from battery 128 through conductor 98 and series connected resistors 114 and 118. The resistance of this circuit is so high, however, as to not put an appreciable drain on the battery 128. It is also pointed out that the voltage divider network connected between resistor 60 and conductor 44 is permanently connected across battery 128 during a shut-down condition of the system. The resistance of this circuit, however, is sufficiently high as to not put any substantial drain on the battery 128.

From the foregoing it will be appreciated that the electrical system of this invention is permanently connected with the battery 128 in such a manner that the output transistor 34 is biased continuously conductive by the battery during a shut-down condition of the system. This does not put an undue drain on the battery 128, however, due to provision of the high valued resistor 114 (3,000 ohms) connected between the positive side of battery 128 and junction 68. On the other hand, when the generator is driven by the engine to cause the output voltage of the alternator to build up to its desired regulated value sufficient base drive current to operate the regulator is then provided through the lower valued resistor 118 via the field energizing diodes 28. As previously mentioned, the resistor 114 is approximately 3,000 ohms and the resistor 118 approximately 500 ohms or a ratio of approximately 6:1 between the two circuits connected to junction 68.

It should be noted that during a shut-down condition of the system the voltage divider connected between junction 60 and ground senses battery voltage. This being true, transistors 64 and 62 are biased off and transistors 36 and 34 are biased on. This is due to the fact that battery terminal voltage is less than the desired regulated output voltage of the system when the generator is being driven to supply the electrical loads including the battery.

Although conductor 98 is shown connected to the battery 128 through bridge rectifier conductor 25 and terminal 24 other connecting arrangements could be used for connecting the battery and regulator.

The total current drain on battery 12 during a shut-down condition depends on the resistance of resistor 114, the total resistance of voltage divider 84, 86, 88 and 90 and the total resistance of voltage divider 104, 106 and 108. Each voltage divider has a total series resistance at least as high as the 3,000 ohm resistor 114. The resistance values can be such that the total drain on battery 28 at a shut-down condition may be in the range of 10–15 milliamps for a 12 volt system.

It is claimed:
1. An electrical system for a motor vehicle comprising, an alternating current generator having an output winding and a field winding, a full-wave power bridge rectifier network having positive and negative direct voltage output terminals and A.C. input terminals connected to said generator output winding, a second rectifier circuit connected to said generator output winding having direct voltage output terminals, a transistor voltage regulator including an output transistor having base, emitter and collector electrodes, said voltage regulator having a voltage sensing circuit, means connected between said voltage sensing circuit and the base-emitter circuit of said output transistor for controlling the conduction of said output transistor as a function of the direct voltage applied to said sensing circuit, means electrically connecting said field winding and the collector-emitter circuit of said regulator output transistor in series across the direct voltage output terminals of said second rectifier circuit, a battery, means electrically connecting said battery across the direct voltage output terminals of said power bridge rectifier network, means electrically connecting said voltage sensing circuit of said voltage regulator across said battery and across the direct voltage output terminals of said power bridge rectifier network whereby said voltage regulator responds to the voltage across said battery, a first electrical circuit for supplying base emitter current to said output transistor connected across said battery and including in a series connection first resistor means and the base-emitter circuit of said output transistor, said first circuit forming a closed circuit connected across the battery during both running and shut-down conditions of operation of said generator, said first resistor means having a resistance value that is high enough to prevent substantial battery drain through said first circuit when said generator is in a shut-down condition, said first electrical circuit operative to bias said output transistor conductive by battery voltage when said generator is in a shut-down condition, and a second electrical circuit including second resistor means connected across the direct voltage output terminals of said second rectifier circuit and including the base-emitter circuit of said output transistor, said second circuit operative to provide base-emitter drive current to said output transistor when said generator is running to supply the electrical loads on said vehicle, said second resistor means having a resistance value substantially lower than said first resistor means whereby increased base-emitter drive current is supplied to said output transistor during running operation of said generator, said output transistor operating in a switching mode during said running operation to regulate the output voltage of said generator.

2. An electrical system for a motor vehicle comprising, an alternating current generator having a polyphase output winding and a field winding, a polyphase full-wave power bridge rectifier network comprised of a plurality of diodes having AC input terminals connected to said output winding and direct voltage output terminals, a plurality of auxiliary diodes connected to said output winding, said auxiliary diodes and certain diodes of said main power bridge rectifier network defining a second full-wave bridge rectifier circuit having direct voltage output terminals, a transistor voltage regulator including an output transistor having base, emitter and collector electrodes, said voltage regulator having a voltage sensing circuit, said regulator having a junction connected to the base-emitter circuit of said output transistor, means including second transistor means connected to said junction and to said voltage sensing circuit for varying the voltage of said junction as a function of the voltage sensed by said sensing circuit to thereby control the conduction of said output transistor, means connecting the collector-emitter circuit of said output transistor and said field winding in series across the direct voltage output terminals of said second rectifier circuit, a battery, means connecting said battery across the direct voltage output terminals of said power bridge rectifier, means connecting said voltage sensing circuit of said voltage regulator across said battery and across the direct voltage output terminals of said power bridge rectifier, a first circuit for supplying base-emitter current to said output transistor during a shut-down condition of said generator connected across said battery including in a series connection first resistor means and the base-emitter circuit of said output transistor, said first resistor means connected between one terminal of said battery and said junction, said first circuit providing a closed circuit path that is connected across said battery during both shut-down and running operation of said generator, said first resistor means having a resistance value that is high enough to prevent substantial battery drain through said first circuit when said generator is in a shut-down condition, said first circuit operative to bias said output transistor conductive by battery voltage when said generator is in a shut-down condition, and a second circuit for supplying base-emitter current to said output transistor when said generator is running, said second circuit connected across the direct voltage output terminals of said second rectifier circuit and including in a series connection second resistor means and the base-emitter circuit of said output transistor, said second resistor means connected between one direct voltage output terminal of said second rectifier circuit and said junction, said second circuit operative to provide base drive current to said output transistor when said generator is being driven, said second resistor means having a resistance value substantially lower than said first resistor means whereby increased base drive current is supplied to said output transistor during running operation of said generator, said output transistor operating in a switching mode during running operation of said generator to regulate the output voltage of the generator.

* * * * *